United States Patent [19]

Sato

[11] Patent Number: 4,813,095
[45] Date of Patent: Mar. 21, 1989

[54] EXTENDABLE WINDSHIELD WIPER

[76] Inventor: Shigetaka Sato, Box 1073, State University of Binghamton, Binghamton, N.Y. 13901

[21] Appl. No.: 75,736

[22] Filed: Jul. 20, 1987

[51] Int. Cl.$^4$ .............................................. B60S 1/02
[52] U.S. Cl. ................................ 15/250.24; 15/250.21
[58] Field of Search ........... 15/250.21, 250.23, 250.24, 15/250.25

[56] References Cited

U.S. PATENT DOCUMENTS

| | | | |
|---|---|---|---|
| 860,021 | 7/1907 | Fesenfeld | 15/250.19 |
| 2,552,822 | 5/1951 | Smulski | 15/250.23 |
| 2,629,891 | 3/1953 | Greene | 15/250.23 |
| 2,829,394 | 4/1958 | Brigmon | 15/250.21 |
| 2,901,764 | 9/1959 | Anderson | 15/250.25 |
| 2,979,752 | 4/1961 | Krohm | 15/250.21 |
| 3,831,220 | 8/1974 | Gmeiner | 15/250.21 |
| 4,418,440 | 12/1983 | Sigety | 15/250.21 |
| 4,447,928 | 5/1984 | Schuch | 15/250.21 |
| 4,584,734 | 4/1986 | Leroy | 15/250.21 |
| 4,639,966 | 2/1987 | Kuhbauch | 15/250.23 |

Primary Examiner—Harvey C. Hornsby
Assistant Examiner—K. L. O'Leary
Attorney, Agent, or Firm—Schmeiser, Morelle & Watts

[57] ABSTRACT

A compound windshield wiper having a blade assembly consisting of a main wiper blade and an adjacent and secondary reciprocating blade in slideable registry therewith. The secondary blade, slideable attached to the main blade by an interlocking bearing-in-slot assembly, is driven towards an extended position during the wiper's arcuate sweep along the windshield, thus allowing the secondary blade, called a traveler blade, to clean portions of the windshield that are normally uncleaned by the traditional windshield wiper blade system. The means for extending the secondary blade comprises a simple cable system that both extends and retracts the secondary blade. The cable may be driven by either a motor means that is synchronized with the wiper sweep, similar to or identical with modern vehicle wiper system motors or, by anchoring the terminus of the cable (the proximal end) to some point of the window frame or vehicle body. Then, as the wiper arm draws closer to or further from the proximal connection, the relative cable length will be either shortened or lengthened, thus extending or retracting the secondary blade.

4 Claims, 3 Drawing Sheets

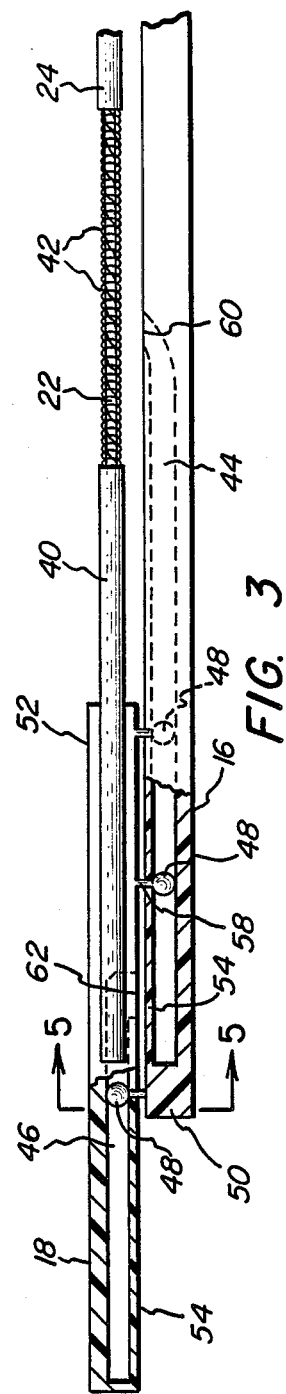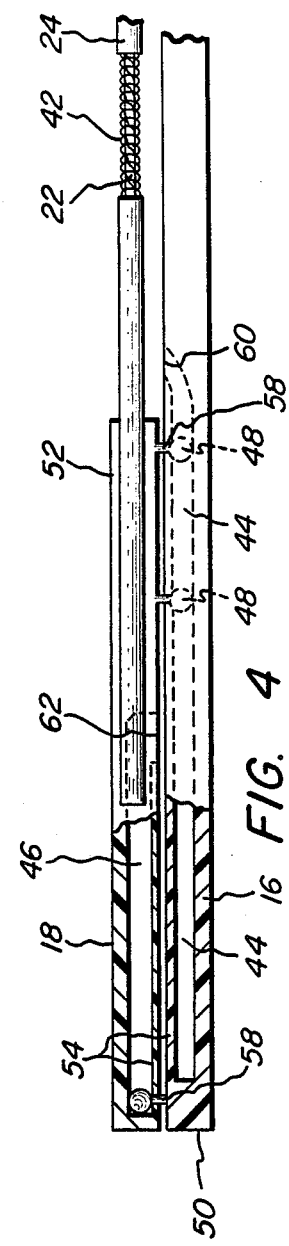

EXTENDABLE WINDSHIELD WIPER

FIELD OF THE INVENTION

This invention relates to a windshield wiper for use generally on motor vehicles and, particularly, to an extendable wiper arm mechanism having the same track as the primary windshield wiper found on most vehicles. The invention differs from traditional systems in that an extendable portion is engaged to clean portions of the windshield or windscreen not ordinarily cleaned by conventional windshield wiper mechanisms.

BACKGROUND OF THE INVENTION AND PRIOR ART

A significant number of improvements to windscreen or windshield wiper systems have been made since the early 1970's. During a period of increasing automotive manufacturer awareness of the need for additional safety on the nation's highways, a correlative development in the instant art took place. As speeds increased, along with trip distances, better driver vision through the windscreens or windshields was mandated. To this end, the automotive world saw the advent of automatic windshield wipers, windshield washers, and alterations of windshield geometry in order to give a better and clearer field of vision. During inclement weather, the most noticeable degradation of safety is the likelihood of sliding or striking obstructions in the road. The former, although not directly attributable to reduced vision, is nonetheless compounded by it; and, the latter is undoubtedly caused by reduction in vision. Rain and mud spattering can be adequately removed by the traditional wiper blade; however, the addition of automatic windshield washing, although making the cleansing activity easier, did nothing to extend an already diminished field of vision. In a patent issued to Brigmon in 1958, U.S. Pat. No. 2,829,394, an invention was presented that appeared to anticipate the aforementioned problems and effectively clean a much wider area of the windshield. The device of Brigmon envisioned a wiping blade that traversed a windshield motivated by an arcuate sweeping arm (in the traditional fashion) but that was captured at the top and bottom of the blades by parallel grooves. No evidence exists to disclose why such a device never became the norm in windshield cleaning; but, it appears to this inventor that the strong likelihood of material fouling of at least the lower groove could probably frustrate proper operation of the Brigmon invention. Failure of the windshield wiper system entirely, during a time of extreme need, is indeed a serious drawback.

An invention relating to a reciprocating windshield wiper blade was disclosed in U.S. Pat. No. 3,831,220 which issued to Gmeiner in 1974. In this windshield wiper system, the rotary motion of a drive source is, through a link coupling, converted to a reciprocating motion that is applied to the main wiper blade of the windshield wiper system. The main wiper blade is compelled to move outward during the major portion of its sweep so that its tip nearly touches the top margin of the windshield. A rather severe disadvantage of this type invention is that, as more area near the top of the windscreen is swept clean by the extended blade, a greater portion in the lower part of the windscreen is left unswept. For this invention, the concomitant loss of a smaller portion near the bottom of the windshield was evidently considered worthwhile. Such a hand-off, however, does not serve the instant inventor's purpose.

Four other U.S. patents issued to Krohm, Sigety, Schuech, and Leroy, U.S. Pat. Nos. 2,979,752, 4,418,440, 4,447,928, and 4,584,734, respectively, are contributions and improvements to the windshield wiper art. Krom modifies the area of sweep of the windshield wiper by modifying the movement of the blade proper. On the other hand, Sigety uses a telescoping wiper arm which extends and retracts (reciprocates) on the guide arm, out of and into a wiper arm, as it is driven by an endless belt drive means. It is noteworthy that Sigety's mechanism telescopes from the wiper arm rather than from the main wiper blade assembly. Thus, as in the Gmeiner invention, any new area coverage by the extension of the wiper blade concomitantly omits a similar geometry (albeit a smaller one) at the base of the windshield. Schuech effectively teaches the Sigety invention, but does so using a different mechanical means (through lever arms and cams) to reciprocate the wiper blade. The aforementioned major disadvantages of the Gmeiner and Sigety inventions still obtains in the Schuech invention. The same summary and conclusions also apply to the invention disclosed by Leroy.

Thus, the major disadvantages of the extant prior art, and which have been effectively overcome by the instant invention, were the inability to wipe larger areas of a windshield or windscreen, with a seemingly conventional type windshield wiper blade, without sacrificing the cleaning of other areas of the windshield. To individuals of shorter stature, a loss of lower windshield cleansing would appear most significant. To the extent that some developments were made and taught using the art of extending a blade, none appeared to literally extend the blade proper and, in all cases, the mechanisms that were used to reciprocate the main blade appeared highly mechanistic, involved, and often laboriously contrived.

SUMMARY OF THE INVENTION

Optimum visibility through maintenance of clean windshields on vehicles constitutes an important factor towards reducing the number of motor vehicle accidents that are caused by driver-impaired vision. The instant invention is specifically adapted to overcome disadvantageous aspects of the prior art. The instant invention is a compound windshield wiper blade system that cleans essentially the entire windshield by employing a secondary wiper arm held parallel and closely to the main wiper arm i.e. the wiper proper. The main wiper arm, ostensibly a conventional wiper blade, cleans the same arcuate segment as do traditional or conventional blades. However, in the instant invention the secondary wiper blade is extendable and retractable, while being linearly co-extensive with the wiper blade proper; and, through such reciprocative motion, cleans portions of the windshield normally left unswept. The compound blade aspect of the instant invention will not impair the driver's vision any more than does the conventional single blade. The secondary wiper blade, called the "traveler" or traveler blade is fastened to the main blade and the entire assembly, as a unit, is fitable to the conventional wiper arm that has undergone the smallest of modifications.

The present invention has overcome the construction complexity of the prior art by inculcating a very simple traveler blade drive means. It is well known to those versed in connector and drive cable techniques that a wire sheathed in a fixed conduit may be employed to impart reciprocative motion to any object that it is attached. The instant invention embodies this basic principle by attaching a wire to the base of the traveler blade, passing it thence through a fixed conduit which is, in the preferred embodiment, integral with the wiper arm assembly, and terminating it at a point near the wiper arm base, where it is removably fixed thereon. By judicious placement of the wire terminus, it is possible to impart a reciprocating motion to the traveler by moving the wiper arm toward and, alternatively, away from the point of fixation. Proper selection of the point of fixation would allow an extension of the traveler blade as the wiper arm moves through its arcuate path. Where such a simplistic means of reciprocating a traveler blade cannot be employed, the rotary motion of the wiper arm driving source (the windshield wiper system motor) may be taken off by means of a cam that is synchronized to push the wire at the point that the main blade begins to traverse the desired extension portions of its arcuate path.

BRIEF DESCRIPTION OF THE DRAWINGS

Of the drawings;

FIG. 3 is the sectionalized top view of the invention, in the traveler blade extended mode;

FIG. 4 is a sectionalized top view of the invention with the traveler blade in the retracted mode;

DETAILED DESCRIPTION OF THE PREFERRED EMBODIMENT

Figure 1:
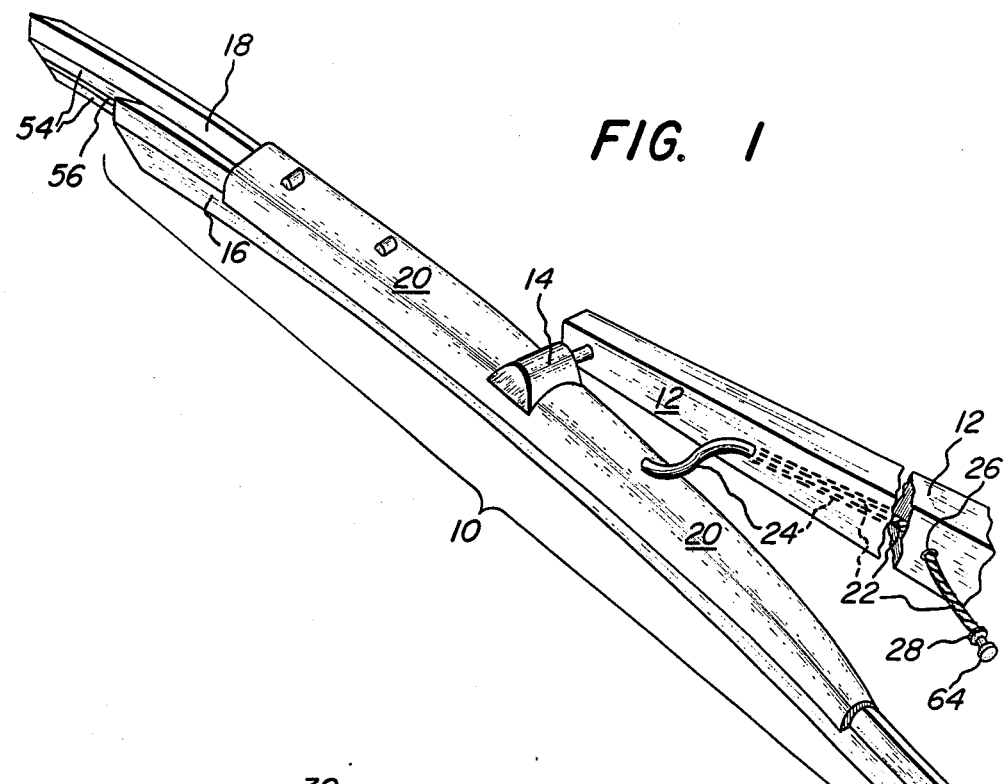
FIG. 1 is an isometric illustration of the subject invention.

Reference being had now to FIG. 1, there is depicted in isometric illustration of the invention 10 operationally connected to wiper arm 12 on rocking mount 14. The compound blade system composed of main blade 16 and adjacent traveler blade 18 is enclosed in hooding sheath 20. The reciprocating motion of traveler blade 18 is effected by the action of wire or cable 22 which feeds through conduit 24 as it provides the channel guide from its beginning proximate hood 20 over to wiper arm 12, passing therethrough and terminating at conduit port 26. Cable 22, after passing out of conduit port 26 is either removably fixed to a portion of the windshield frame or molding, or it is connected to a linkage (not shown) that is motivated by the windshield wiper system motor. The conduit 24 may be rigidly affixed to wiper arm 12 either on the inside, as depicted in FIG. 1 or secured on the outside by suitable clamping means. In operation, it may be readily seen that when cable terminus 28 is either fixed or motivated so that there is a relative motion (reciprocating) between cable 22 and conduit 24 (which is fixed), traveler blade 18 to which cable 22 is attached will be driven to the extended or retracted position, relative to main wiper blade 16. This is the main operating principle that is set forth in FIGS. 1 and 2.

Figure 2:
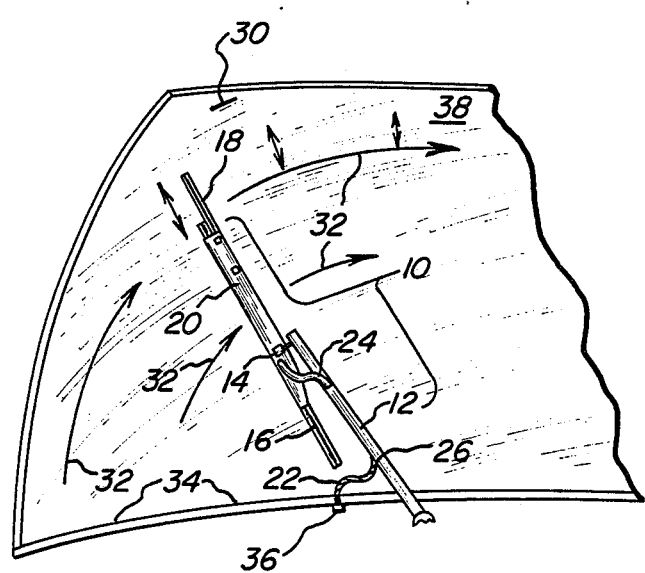
FIG. 2 is an illustration of the invention in place relative to the passenger side windshield of a modern vehicle.

Referring more particularly to FIG. 2, the invention is depicted in operation over the passenger side windshield 30 of a modern vehicle. The blades' arcuate path, indicated by arrows 32, is shown as the invention 10 sweeps from the base of the windshield 34 to its fully actuated position near the center of the windshield (not numbered). The reader will note that, as the invention sweeps toward position 34, cable 22 which is rigidly fixed at 36 is pushed up through conduit 24 (not shown) causing the extension of traveler blade 18. This extension process will be continued until the entire blade assembly is positioned near 34 and, at that time, traveler blade 18 will have reached its maximum extended position. Conversely, as the invention sweeps upward, through its arcuate path towards position 38, the increase in the spacing between port 26 and fixing position 36 of cable 22 will be lengthened resulting in the retraction of traveler blade 18. This is the least expensive method that the inventor conceives for effecting the reciprocating motion of traveler blade 18. Those versed in the art may readily conceive of alternative motivation for cable 22, such as the attachment of terminal end 28 to a rotating arm or cam that is driven synchronously by and with the wiper motor.

A partially sectionalized top view of the invention 10 is illustrated in FIG. 3. Traveler blade 18 is shown juxtaposed main blade 16, but in an extended position. Blade guide 40, connected to cable 22 is connected by coiled spring 42 to sheath 24. It is by this mechanism that cable 22 drives traveler blade 18 and, in the event of breakage of the cable, traveler blade 18 may be rapidly withdrawn to its retracted position, as shown in FIG. 4. The mechanisms detailed in FIGS. 3 and 4 are identical; and, therefore, the remaining description relative to FIG. 3 is common to FIG. 4. Partially covered grooves 44, 46 are located in main blade 16 and traveler blade 18, respectively. It is the purpose of these grooves to retain bearings 48 which project sideways, in opposing fashion, from the blades. In the preferred embodiment, the inventor prefers a singular bearing near the distal end 50 of the main blade and at least one bearing, projecting from the traveler blade 18 near its proximal end 52. A slotted groove cover 54 is provided to cover grooves 44 and 46. The slot portion 56 (not shown except in FIGS. 1 and 5) has the purpose of passing bearing shafts 58 while the cover 54 retains the bearings 48. To allow ease of replacement, traveler blade 18 is easily disconnected from cable 22. Bearings 48 of the main blade 16 and of the traveler blade, 18 may be slid into registry with respective insertion ports 60 of the main blade and 62 of the traveler blade and the cable-free traveler blade pulled away from the main blade.

Those having experience in the changing of windshield wiper blades will recognize the utility of the unique traveler blade connection capability. Complete removal of the compound blade system 10 is effected by rapid disconnect (not shown) at rocker connector 14 and rapid disconnect of the cable 22 at either the proximal end of traveler blade 18 or at terminus 28. Since actual connection is made by snapping ends 64 of cable 22 into retainer clips at 36, and the proximal end 52 of traveler blade 18, it is possible to employ clip-in ends 64 having a narrower cross section than the cable proper and thus allow passage of the cable from either end completely through conduit 24. The facility that allows the motivating cable 22 to be inserted either from the proximal or distal ends of the conduit 24 more strongly highlights the utility of the invention's rapid replacement features.

Figure 5:
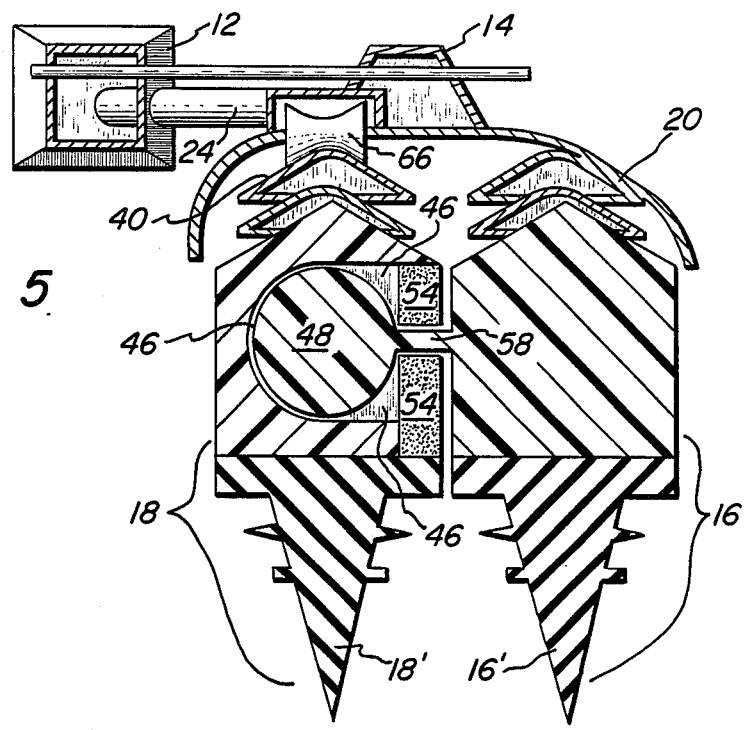
FIG. 5 is the front, sectional elevation of the invention taken at 5—5 of FIG. 3.
Figure 6:
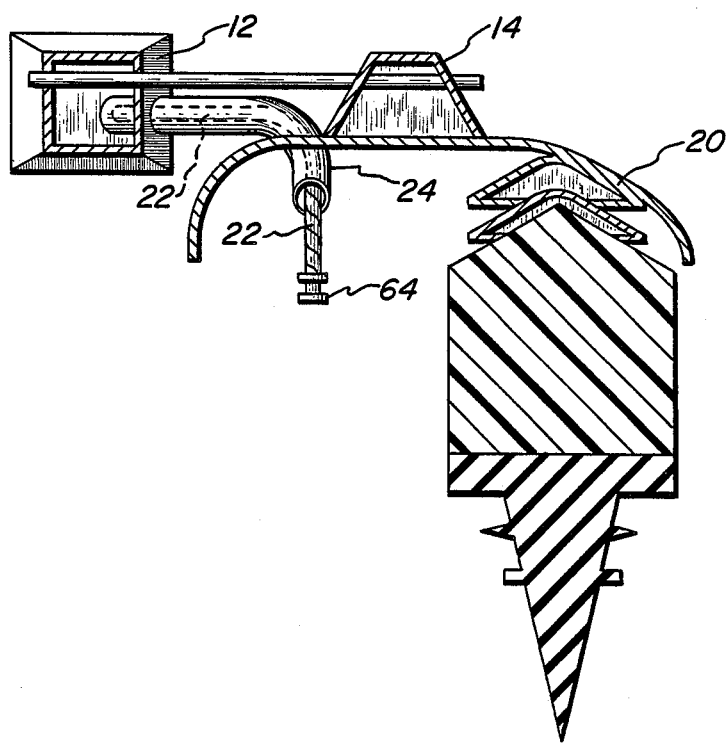
FIG. 6 is the front elevational view of FIG. 4 with the traveler blade omitted and exposing the drive wire.

FIG. 5 is a front sectional elevation of the invention taken at 5—5 of FIG. 3 and directed toward the proximal ends of the main and traveler blades. The sectioning is taken through the singular forward bearing 48 of main blade 16. Here, traveler blade 18 is seen capturing main blade 16 guide bearing 48 in a stylized (and not accurately represented) groove 46. Also stylized, slotted groove cover 54 encloses the groove with but a single longitudinal gap 56 (see FIG. 1) to allow passage of the bearing shaft 58. Guide 40 is seen in registry with roller 66. It should be understood that the entire blade apparatus 16, 18 need not be unitary; but rather the upper portions of both blades may be of different compositions and merely bonded to blade-windshield contact surfaces 16', 18'. In FIG. 6, traveler blade 18 has been removed to more clearly indicate hood 20, rocker connecting mechanism 14, conduit 24, wiper arm 12 and cable 22 with connector end 64.

The aforementioned description, in conjunction with the simplified drawing explained herein, constitutes an adequate working description to explain the principles of the invention. Those familiar with the art may conjecturize alternative modes of connection, registration, and motivation of the essential parts herein, namely the juxtaposed reciprocating traveler blade, the stationary main blade, and motivation means for reciprocating the traveler blade. Nonetheless, practise may be had with the invention, with means alternative to the specific details herein disclosed, without departing from the main principles of the invention. It is therefore the inventor's intention to secure available right to practise those principles, as well as the detailed apparatus therein, limited only by the appended claims.

What is claimed:

1. A compound blade windshield wiper for mounting to a wiper arm comprising the combination of:
   a windshield wiper arm having a conduit therethrough, said conduit adapted to receive a cable therethrough, one end of said conduit protruding from said arm proximate the tip of said arm and the other end terminating near the base of said arm;
   an elongated hood for enclosing at least a pair of wiper blades comprising of a main wiper blade and a traveler wiper blade, said hood secured to said windshield wiper arm by a rocking mount and receptive of the protruding end of said conduit, said rocking mount comprising a rocker assembly that allows said main and said traveler blades to rock with respect to the windshield and said wiper arm while compelling said hood to follow the track of said wiper arm as it moves over said windshield;
   a main wiper blade of said pair secured to said hood and having slidable traveler wiper blade connection means longitudinally thereon and along at least one side thereof;
   a traveler wiper blade of said pair having slidable main wiper blade connection means along one longitudinal side for slidably engaging said main blade in juxtaposed registry therewith; and
   reciprocative motivation means comprising a cable slidably inserted through said conduit for reciprocating said traveler blade while it is held in said slidable juxtaposed registry with said main blade by said cooperative slidable connections of said blades.

2. The invention of claim 1 wherein reciprocative motivation means further comprises:
   said cable attached at one end to said traveler blade and passing through said conduit, said conduit providing a stationary reference for said cable; and
   attachment means at the other cable end for fixing said other end and for effecting reciprocation of said cable with respect to said conduit.

3. The invention of claim 2 wherein said attachment means further comprises attachment to a wiper drive motor link whereby said cable is driven reciprocatively in said conduit.

4. The invention of claim 2 wherein said attachment means comprises means for fixing said end to a position free of said conduit and proximate thereto.

* * * * *